(12) United States Patent
Stolpman et al.

(10) Patent No.: US 10,909,214 B2
(45) Date of Patent: *Feb. 2, 2021

(54) DETERMINING A LOAD STATUS OF A PLATFORM USING A LIKELIHOOD RATIO TEST

(71) Applicant: BlackBerry Limited, Waterloo (CA)

(72) Inventors: Victor James Stolpman, Spring, TX (US); Dake He, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/800,645

(22) Filed: Feb. 25, 2020

(65) Prior Publication Data

US 2020/0192972 A1 Jun. 18, 2020

Related U.S. Application Data

(63) Continuation of application No. 15/350,488, filed on Nov. 14, 2016, now Pat. No. 10,572,570.

(51) Int. Cl.
*G06F 17/18* (2006.01)
*G06Q 10/08* (2012.01)
*G01S 17/04* (2020.01)
*G01V 8/10* (2006.01)
*G06Q 50/28* (2012.01)

(52) U.S. Cl.
CPC .............. *G06F 17/18* (2013.01); *G01S 17/04* (2020.01); *G01V 8/10* (2013.01); *G06Q 10/083* (2013.01); *G06Q 50/28* (2013.01)

(58) Field of Classification Search
CPC ........... G01V 8/10; G06F 17/18; G06Q 50/28
See application file for complete search history.

(56) References Cited

U.S. PATENT DOCUMENTS

| 5,347,274 A | * | 9/1994 | Hassett | G08G 1/123 340/988 |
| 5,712,789 A | * | 1/1998 | Radican | G06Q 10/08 700/226 |
| 6,148,291 A | * | 11/2000 | Radican | G06Q 10/08 705/22 |
| 6,803,556 B2 | * | 10/2004 | Sugiyama | G01V 8/16 250/214 A |
| 7,221,288 B2 | * | 5/2007 | Fitzgibbon | E05F 15/43 250/221 |

(Continued)

FOREIGN PATENT DOCUMENTS

EP 0925967 A2 6/1999
WO 2006/130881 A2 12/2006

(Continued)

OTHER PUBLICATIONS

Wikipedia, Gyroscope last modified Jun. 5, 2016 (18 pages).

(Continued)

*Primary Examiner* — Manuel A Rivera Vargas
*Assistant Examiner* — Yaritza H Perez Bermudez
(74) *Attorney, Agent, or Firm* — Trop, Pruner & Hu, P.C.

(57) ABSTRACT

In some examples, measurement data is received from at least one sensor that detects a signal reflected from a surface inside a platform. A likelihood ratio test is applied using the measurement data, and a load status of the platform is determined based on the likelihood ratio test.

19 Claims, 5 Drawing Sheets

(56) References Cited

U.S. PATENT DOCUMENTS

| | | | | |
|---|---|---|---|---|
| 7,916,016 | B2* | 3/2011 | Auerbach | B65D 79/02 340/539.26 |
| 8,213,022 | B1* | 7/2012 | Riza | G01B 11/026 356/495 |
| 8,280,345 | B2* | 10/2012 | Twitchell, Jr. | G06Q 10/08 455/404.2 |
| 8,284,045 | B2* | 10/2012 | Twitchell, Jr. | G06Q 10/08 340/539.1 |
| 9,015,071 | B2* | 4/2015 | Breed | G06Q 10/06 705/28 |
| 9,310,323 | B2* | 4/2016 | Bendahan | G01N 9/24 |
| 9,434,558 | B2* | 9/2016 | Criswell | B65G 67/24 |
| 2004/0183673 | A1* | 9/2004 | Nageli | G01S 5/0018 340/539.13 |
| 2006/0109106 | A1* | 5/2006 | Braun | G06Q 10/08 340/539.13 |
| 2006/0181700 | A1* | 8/2006 | Andrews | G01N 21/474 356/237.2 |
| 2009/0067730 | A1* | 3/2009 | Schneiderman | G06K 9/6282 382/224 |
| 2009/0076389 | A1* | 3/2009 | Jin | G01S 13/904 600/437 |
| 2009/0325658 | A1* | 12/2009 | Phelan | G01F 23/0007 460/6 |
| 2012/0294181 | A1* | 11/2012 | Ekelin | H04L 41/0896 370/252 |
| 2012/0314059 | A1* | 12/2012 | Hoffmann | G06T 7/0004 348/135 |
| 2013/0057405 | A1 | 3/2013 | Seelman | |
| 2013/0092816 | A1* | 4/2013 | Barrett | G01J 9/00 250/201.9 |
| 2013/0269832 | A1* | 10/2013 | Gengerke | B65B 1/48 141/95 |
| 2014/0258355 | A1* | 9/2014 | Chu | G06F 17/18 708/446 |
| 2015/0006605 | A1* | 1/2015 | Chu | G06Q 10/067 708/446 |
| 2016/0054148 | A1 | 2/2016 | Misfatto | |
| 2016/0076225 | A1 | 3/2016 | Atkinson et al. | |
| 2016/0094766 | A1 | 3/2016 | Stanley | |
| 2016/0189511 | A1* | 6/2016 | Peterson | E05B 39/00 340/545.3 |
| 2018/0012461 | A1* | 1/2018 | Hill | B64C 19/00 |
| 2018/0031604 | A1* | 2/2018 | Chennakeshu | G01D 21/02 |
| 2018/0038991 | A1* | 2/2018 | Chennakeshu | G01S 7/4808 |
| 2018/0137086 | A1* | 5/2018 | Stolpman | G01V 8/10 |
| 2018/0276367 | A1* | 9/2018 | Benson | H04W 4/02 |
| 2018/0347895 | A1* | 12/2018 | Jonsson | G05B 19/042 |

FOREIGN PATENT DOCUMENTS

| | | |
|---|---|---|
| WO | 2006130881 A2 | 12/2006 |
| WO | 2008/033981 A2 | 3/2008 |
| WO | 2008033981 A2 | 3/2008 |
| WO | 2009/079685 A1 | 7/2009 |
| WO | 2016/001481 A1 | 1/2016 |
| WO | 2016/066422 A1 | 5/2016 |
| WO | 2016/089305 A1 | 6/2016 |

OTHER PUBLICATIONS https://developer.android.com/guide/topics/sensors/sensors_motion.html—Motion Sensors—Android Developers downloaded Jun. 23, 2016 (13 pages).

Faragher, Ramsey, Lecture Notes, Understanding the Basis of the Kalman Filter Via a Simple and Intuitive Derivation, Aug. 20, 2012 (5 pages).

Wikipedia, Kalman filter dated on or before Mar. 30, 2016 (42 pages).

European Patent Office, International Search Report and Written Opinion for PCT/US2017/061358 dated Jan. 5, 2018 (10 pages).

* cited by examiner

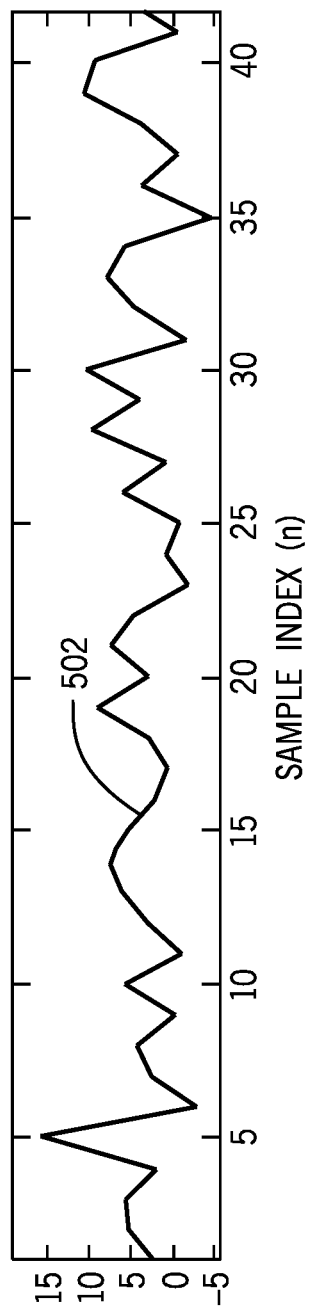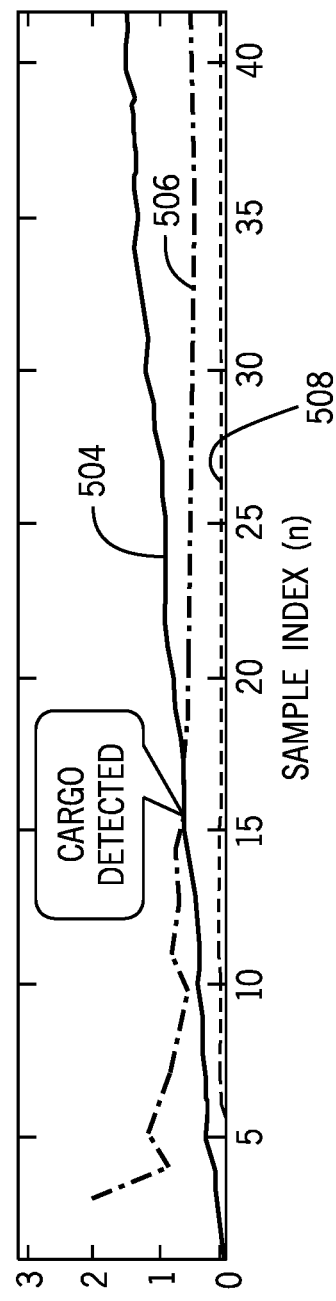

DETERMINING A LOAD STATUS OF A PLATFORM USING A LIKELIHOOD RATIO TEST

CROSS REFERENCE TO RELATED APPLICATIONS

This is a continuation of U.S. application Ser. No. 15/350,488, filed Nov. 14, 2016, which is hereby incorporated by reference.

BACKGROUND

Trucks, tractor-trailers, or tractors that are connected to chassis for carrying containers can be used to transport cargo that includes goods. Trucks, tractor-trailers, and containers typically have doors that can be opened to allow access to cargo that is being transported, and closed to secure the cargo.

BRIEF DESCRIPTION OF THE DRAWINGS

Some implementations of the present disclosure are described with respect to the following figures.

FIGS. 5A and 5B are graphs plotting output values computed by likelihood ratio tests as a function of measurement samples, according to some implementations.

DETAILED DESCRIPTION

Figure 1A:
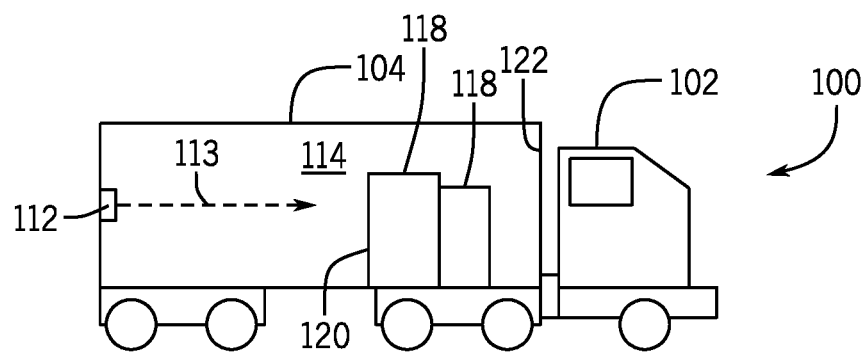
FIGS. 1A-1B are schematic diagrams of a container hauled by a vehicle, the container including a door and a sensor device according to some implementations.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A moveable platform can be used to carry physical items between different geographic locations. For example, the moveable platform can be a container (that is attached to a tractor), a truck, or a trailer, where the container provides an enclosed space in which the physical items can be stored during shipment. In other examples, the moveable platform can include another type of carrier structure that is able to carry physical items. More generally, the moveable platform can be part of, mounted on, or attached, as applicable, to a vehicle, such as a truck, a trailer, a tractor, a car, a train, a ship, an airplane, and so forth. In the ensuing discussion, a moveable platform can be referred to as a container. It is noted that techniques or mechanisms according to some implementations can be applied to other cargo carrying platforms with an entry barrier that can be opened and closed.

A moveable platform can include a door through which physical items can be loaded or unloaded into or from an inner chamber of the moveable platform, respectively. The door is an example of an entry barrier (or more simply, a "barrier") that can be opened and closed. Other examples of barriers include a window or any other structure that can be opened to allow entry through an opening, or closed to block entry through the opening An entity such as a shipper, a distributor, a manufacturer, a seller of goods, or any other entity may wish to track assets (such as cargo) that are being transported using moveable platforms. To do so, a sensor device can be mounted on a moveable platform. Sensor devices on various moveable platforms can communicate sensor information over a network to a remote service to allow the remote service to track assets that are being moved by various moveable platforms. The remote service can include a server or a collection of servers and associated network equipment that may be located at one fixed location or in a mobile unit or as part of a data center or cloud. Asset tracking can involve tracking the current locations of the assets, cargo load status of moveable platforms, conditions of the environment around the assets (where such conditions can include a measured temperature, a measured humidity, etc.), and/or other information.

A sensor device can include a communication component to communicate over a network. In some examples, sensor devices mounted on moveable platforms can be part of a larger network of devices. This larger network of devices can be part of the "Internet-of-Things" (IoT) technology paradigm to allow different types of devices to communicate different types of data (including sensor data, voice data, video data, e-mail data, picture or image data, messaging data, web browsing data, and so forth). In addition to network traffic communicated by computers, smartphones, wearable devices, and the like, the IoT technology paradigm contemplates that other types of devices, including household appliances, vehicles, sensor devices, thermostats, and so forth have connectivity to a network to allow the devices to communicate respective data.

More generally, asset tracking using network connected sensor devices can involve acquiring sensor data, transmitting the sensor data, and aggregating such sensor data or producing other measures based on the sensor data to determine information associated with the assets that are being transported by moveable platforms. Based on data received from the sensor devices, a server (or servers) can update a database, run analytics, and/or present status information for display, such that further decisions or actions can be performed. The asset tracking can be used to improve fleet utilization, reduce operating cost, reduce loss of assets due to theft, and so forth.

In some examples, a measure that can be derived based on measurements made by a sensor device mounted on a moveable platform is a load status of the moveable platform, where the load status can refer to whether or not the moveable platform contains any physical items such as cargo (i.e., the container is empty or the container contains at least one physical item). More generally, determining a load status can refer to an amount of loading (e.g., 0% loaded, 10% loaded, 25% loaded, 50% loaded, 100% loaded, or by use of some other measure that can have different values that indicate different levels of loading with physical items. Accurately detecting the load status of a container can be challenging due to one or more factors. For example, the characteristics of a moveable platform may change over time, such as due to addition of structures within the chamber of the moveable platform, presence of debris in the moveable platform chamber, cleaning of the inner chamber of the moveable platform, repainting of the inner walls of the moveable platform, and so forth. In addition, the hardware of the sensor device can also vary over time, such as due to varying temperature or due to aging of the hardware, which can affect the sensitivity, gain, and/or other characteristic of a sensor in the sensor device. Moreover, different moveable platforms and different sensor devices may have different characteristics due to variances in manufacturing and/or configuration. Furthermore, the size and construction composition of the moveable platform can vary from one moveable platform to another. Also, the surrounding environment for different sensor devices may be different. Due to such varying characteristics of the moveable platform and/or the sensor device, a determination of a load status based on measurement data from the sensor device may not be accurate.

Additionally, detection systems for detecting a load status of a moveable platform that rely upon measurements of physical distances within the moveable platform to determine if cargo is present may produce sub-optimal results. Sub-optimal detection systems may miss the physical items within a moveable platform, or may provide a false indication that the moveable platform is loaded with a physical item.

In accordance with some implementations of the present disclosure, statistical techniques are applied to determine a load status of a moveable platform. In some implementations, the statistical techniques include likelihood ratio test techniques, where a likelihood ratio test generally refers to a statistical test that is used to compare the goodness of fit of two models, including a first model that is a null model and a second model that is an alternative model. The test is based on a likelihood ratio between the null model representing an empty container and the alternative model representing a loaded container, which expresses how much more likely data fits the null model versus the alternative model. In the context of detecting the load status of a moveable platform, the null model (or null hypothesis) represents a moveable platform is empty, while the alternative model, or alternative hypothesis, represents the moveable platform including at least one physical item (i.e., the moveable platform is loaded).

In some examples, a likelihood ratio test can include a log likelihood ratio (LLR) test. Another likelihood ratio test is a sequential probability ratio test (SPRT), which employs the LLR test to produce multiple LLR outputs for respective multiple measurement data samples. The multiple measurement data samples can include a sequence of measurement data samples collected from at least one sensor for detecting physical items in a moveable platform. The SPRT technique can aggregate (e.g., sum) the multiple LLR outputs values to produce an SPRT value that can be used for determining the load status of a moveable platform. In further examples, another likelihood ratio test technique that can be applied is a general likelihood ratio test (GLRT), which can be applied in instances where certain information relating to a moveable platform is missing, such as the color of the moveable platform or other information relating to a characteristic of the moveable platform. The GLRT technique can thus be applied in cases where partial information regarding characteristics of the moveable platform are available.

Figure 1B:
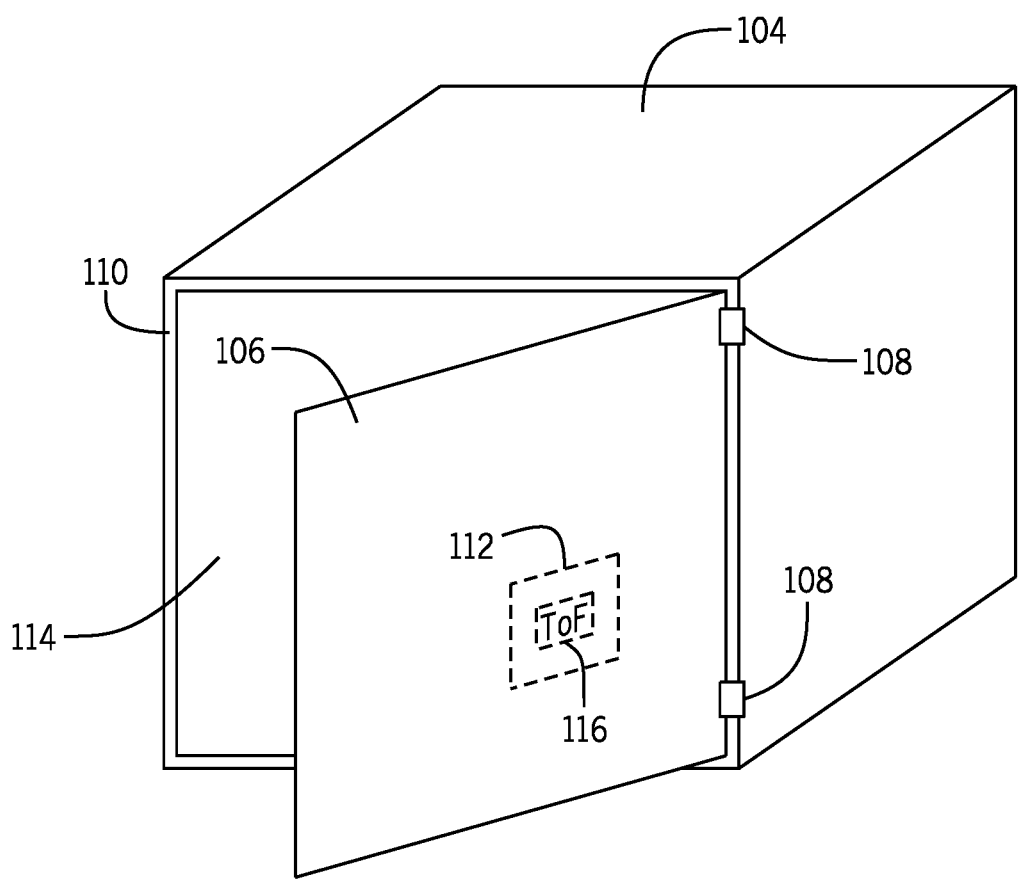

FIGS. 1A-1B illustrate an example truck 100 that includes a tractor unit 102 and a container 104 (provided on a chassis) hauled by the tractor unit 102. The container 104 is an example of a moveable platform that can be used to carry physical items. FIG. 1B is a perspective view of the container 104, to show that the container 104 has a door 106 (or other entry barrier) that is pivotable between an open position and a closed position (or more generally, moveable between an open position and a closed position).

In FIG. 1B, the door 106 is in the open position. The door 106 is pivotably mounted to hinges 108, which are attached to a door frame 110 of the container 104. The door 106 is able to rotate about the hinges 108 between the open position and the closed position. Although FIG. 1B shows two hinges 108, it is noted that in other examples, the door 106 can be mounted on just one hinge, or more than two hinges.

In some examples, a sensor device 112 is mounted to an interior surface of the door 106, such that when the door 106 is closed, the sensor 112 faces towards an inner chamber 114 of the container 104. As noted above, the container 104 is an example of a moveable platform. The inner chamber 114 of the container 104 (referred to as a "container chamber" in the ensuing discussion) is an example of an inner space of the moveable platform in which physical items can be carried. The container chamber 114 is defined by the walls of the container 104. In other examples, the sensor device 112 is not mounted on the door 106, but rather can be mounted on another surface inside the container 104.

In some implementations, in response to a door-closing event, the sensor device 112 can make a measurement for use in determining the load status of the container 104, e.g., to determine whether there is any physical item located within the container chamber 114 of the container 104, or to determine a level of loading of physical items within the container chamber 114. For example, the sensor device 112 includes a Time-of-Flight (ToF) sensor 116.

In some examples, the determination of the load status of the container 104 can be performed by a processor (or multiple processors) in the sensor device 112. In other examples, the determination of the load status of the container 104 can be performed by a remote server computer (or multiple remote server computers) that receive the measurement data from the sensor device 112.

In FIG. 1A, it is assumed that physical items 118 are located within the container chamber 114. The ToF sensor 116 is able to emit a signal 113 that is reflected from a surface inside the container chamber 114. Based on the detection of the reflected signal by the ToF sensor 116, the sensor device 112 outputs measurement data that can be used in likelihood ratio test techniques to determine the load status of the container 104.

In examples where the ToF sensor 116 includes a light emitter, such as a light emitting diode (LED), a transmitted periodic signal can include multiple light pulses that employ an on-off-keying (OOK) of the light emitter. In other examples, other types of transmitted periodic signals can be employed. The ToF sensor 116 includes a light detector to detect light reflected by the light emitter.

In some examples, a light source such as the light emitter mentioned above may be modulated by a modulation signal. The frequency of the modulation signal can be used in converting the phase shift of the reflected light to distance measure. In some examples, the modulation frequency can be in a range between 2 megahertz (MHz) to or 5 MHz to more than 10 MHz, depending upon the ranges of distance to be detected.

In the FIG. 1A example, the emitted signal 113 is reflected from a rear-facing surface 120 of the rear-most physical item 118. The rear-facing surface 120 faces the door 106 of the container 104. In examples where there are multiple physical items, the ToF sensor 116 detects a reflected signal from the physical item 118 that is closest to the door 106.

If the physical items 118 are not present in the container chamber 114, then the ToF sensor 116 detects a signal reflected from an inner front surface 122 of the container 104.

The inner front surface 122 of the container 104 can be the front-most wall of the container 104. In other examples, another structure such as a frame can be located in the container chamber 114 against which physical items 118 can be placed. In such other examples, the inner front surface 122 is a surface of such other structure, or the floor of the container 104.

Although the present discussion refers to examples where the door 106 is located at the rear of the container 104 and physical items 118 are loaded from the front of the container chamber 114 to the rear of the container chamber 114, it is noted that in other examples, the door 106 can be located at a different part of the container 104, such as on a side wall of the container 104, or on a front wall of the container 104. In such other examples, the loading of physical items can be from side to side, or from the rear to the front. The sensor device 112 can also be located on a side wall or the front wall of the container 104 in such other examples.

In the foregoing discussion, it is assumed that measurement data from the sensor device 112 is used to determine the load status of the entirety of the container chamber 114. In other examples, the container chamber 114 can be divided into multiple zones, and the sensor device 112 (or multiple sensor devices 112) can be used to determine the load status of each zone of these multiple zones. Thus, the sensor device(s) 112 can determine a load status of a first zone, a load status of a second zone, and so forth.

Figure 2:
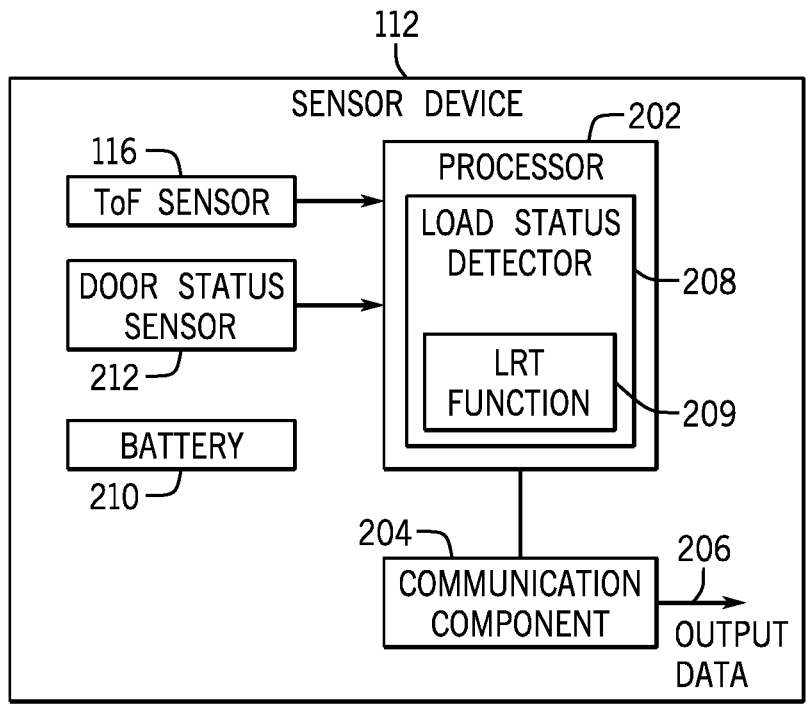
FIG. 2 is a block diagram of an example sensor device according to some implementations.

FIG. 2 is a block diagram of the sensor device 112 according to some examples. The sensor device 112 includes the ToF sensor 116, a processor (or multiple processors) 202, and a communication component 204. A processor can include a hardware processing circuit, such as a microprocessor, a core of a multi-core microprocessor, a microcontroller, a programmable gate array, a programmable integrated circuit device, or any other hardware processing circuit.

The sensor device 112 further includes a battery 210 that provides power to components of the sensor device 112.

In some examples, the processor 202 receives measurement data from the ToF sensor 116, and based on the measurement data, the processor 202 is able to determine a load status of the container 104 (either the load status of the entirety of the container, or the load status of a zone of multiple zones in the container). The processor 202 provides the load status indication to the communication component 204, which transmits the load status indication 206 over a network to a destination, such as a remote service that is used to perform asset tracking.

The communication component 204 can include a wireless transceiver and associated circuits to allow for wireless communication of output data 206 by the sensor device 112 to the network. The wireless communication can include wireless communication over a cellular access network, a wireless local area network, a satellite network, and so forth. Alternatively, the communication component 204 can include a wired transceiver and associated circuits to perform wired communications between the sensor device 108 and the destination.

In other examples, the sensor device 112 does not perform the load status determination, but rather, the sensor device 112 transmits measurement data based on ToF data of the ToF sensor 116 using the communication component 204 to the destination. In such examples, the determination of the load status can be performed by a server (or servers) at the destination, based on the measurement data transmitted by the sensor device 112. In such examples, the processor 202 can simply transfer measurement data received from the ToF sensor 116 to the communication component 204 for transmission to the destination.

In examples where the processor 202 of the sensor device 112 is configured to perform the load status determination, the processor 202 can execute a load status detector 208, which includes software or other machine-readable instructions executable on the processor 202. In other examples, the load status detector 208 can be implemented using hardware. The load status detector 208 determines, based on measurement data from the ToF sensor 116, the load status of the container 104.

In some examples, the load status detector 208 includes a likelihood ratio test (LRT) function 209 that is used to apply a likelihood ratio test using measurement data from the ToF sensor 116 for determining the load status of the container 104. The LRT function 209 can be invoked by the load status detector 208 to apply any of various likelihood ratio test techniques according to some examples, such as the LLR test technique, SPRT technique, or GLRT technique, which are described in greater detail below.

Although the LRT function 209 is shown as being part of the load status detector 208 in FIG. 2, it is noted that in other examples, the LRT function 209 can be separate from the load status detector 208.

In examples where the sensor device 112 does not perform the load status determination, the load status detector 208 and LRT function 209 can be provided at a server (or multiple servers) that is (are) remote from the sensor device 112. Shifting the determination of the load status of a container to a remote server(s), instead of performing the load status determination at the sensor device 112, can reduce the complexity of the sensor device 112, and can allow the sensor device 112 to consume less power to save battery power in the sensor device 112.

In some examples, to reduce power consumption of the sensor device 112, and thus to conserve the battery power, the sensor device 112 can be maintained in a sleep state until an event triggers the sensor device 112 to make a measurement and/or to perform processing tasks. A sleep state refers to a state of the sensor device 112 where the sensor device is powered off, or a portion of the sensor device 112 is powered off, such that the sensor device 112 consumes a lower amount of power than another state of the sensor device, such as an operational state. An operational state of the sensor device 112 is a state of the sensor device 112 where the sensor device is able to perform specified tasks, including measurement of data and/or processing of data. In the operational state, the sensor device 112 consumes more power than the power consumed by the sensor device in the sleep state.

In some examples, an event that can trigger the sensor device 112 to transition from the sleep state to the operational state can be a door close event, which is generated when the door 106 is closed from an open position. The sensor device 112 can include a door status sensor 212 to detect either the opening or closing of the door 106 (FIG. 1) or other entry barrier. Although FIG. 2 shows the door status sensor 212 as being part of the sensor device 112, it is noted that in other examples, the door status sensor 212 can be external of the sensor device 112.

The door status sensor 212 can detect a change in status of the door 106 using any of various mechanisms. For example, a switch can be attached to the door, where the switch changes state in response to the door being opened or closed. As another example, a magnetic sensor can be used, where the magnetic sensor can be in proximity to a magnet when the door is closed, but when the door is opened, the magnetic sensor moves away from the magnet. The magnetic sensor can thus output different values depending upon whether the door is opened or closed. In other examples, acceleration data from an accelerometer and rotation data from a rotation sensor (such as a gyroscope or rotation vector sensor) can be used for detecting the door being opened and closed.

In response to the door status sensor 212 indicating that the door has been closed from an open position, the sensor device 112 can be awakened from the sleep state to the operational state. For example, the ToF sensor 116 can be activated from a lower power state to a higher power state, and/or the processor 202 can be activated from a lower power state to a higher power state. In some examples, in response to detecting that the door has been closed, the sensor device 112 can wait a specified time duration before transitioning from the sleep state to the operational state, such as to avoid triggering multiple transitions between the sleep state and the operational state in a short period of time, such as due to a person opening and closing the door in quick succession. Additionally, the processor 202 can wait to transition from the lower power state to the higher power state to allow the ToF sensor 116 time to power on and initialize and take measurements.

Figure 3:
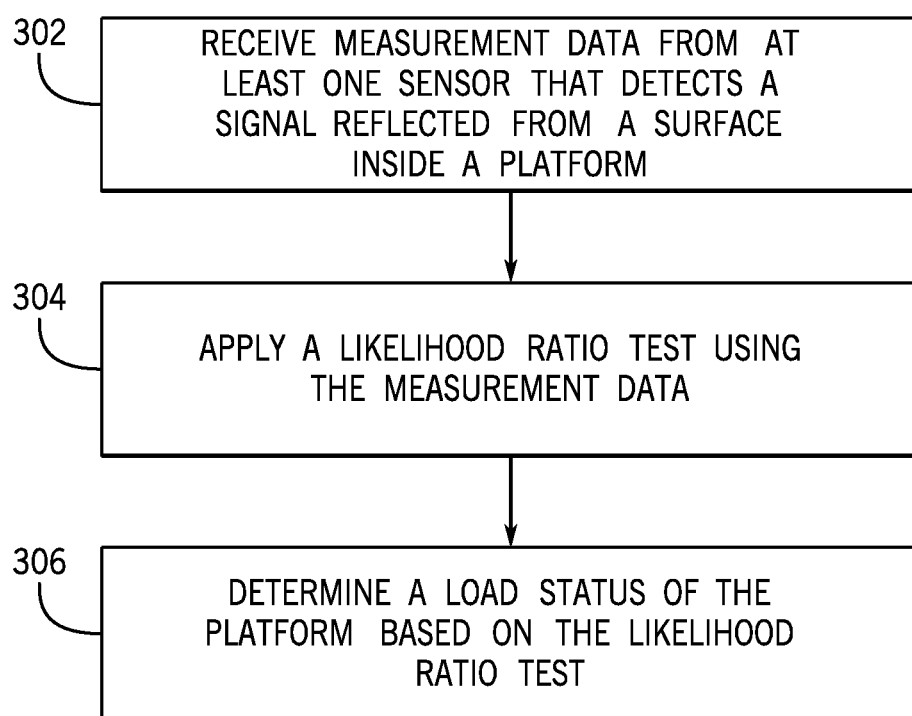
FIG. 3 is a flow diagram of an example process according to some implementations.

FIG. 3 is a flow diagram of an example process for deciding whether a moveable platform such as the container 104 contains a physical item (or physical items) such as cargo. The process of FIG. 3 can be performed by the processor 202 in the sensor device 112, or alternatively, by a remote server.

The process of FIG. 3 includes receiving (at 302) measurement data from at least one sensor (e.g., the ToF sensor 116) that detects a signal reflected from a surface inside the moveable platform. The process of FIG. 3 further includes applying (at 304) a likelihood ratio test using the measurement data. The process determines (at 306) a load status of the moveable platform based on the likelihood ratio test.

The likelihood ratio test that is applied using the measurement data can produce a computed value, which can be compared to one or more thresholds for determining the load status of the moveable platform. For example, if the computed value has a first relationship with respect to the one or more thresholds, then the moveable platform is indicated as being empty. On the other hand, if the computed value has a second relationship with respect to the one or more thresholds, then the moveable platform is indicated as being loaded. In some examples, the first relationship can be a "less than" or "less than or equal" relationship, while the second relationship can be a "greater than" or "greater than or equal" relationship. In other examples, other relationships can be employed.

In some examples, the measurement data from the at least one sensor can be used as a representation of a loaded platform, and the computed value from the likelihood ratio test can be compared with respect to at least one threshold. Determining the load status of the platform is based on the comparing.

In some examples, multiple thresholds can be used, including a lower threshold and an upper threshold. The computed value calculated based on applying the likelihood ratio test on measurement data if less than the lower threshold provides an indication that the moveable platform is empty, while the computed value being greater than the upper threshold provides an indication that the moveable platform is loaded with at least one physical item. In other examples, just one threshold can be used.

Figure 4:
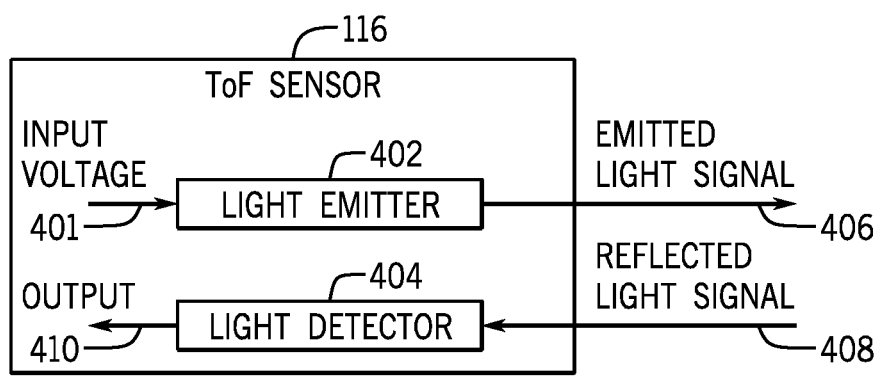
FIG. 4 a block diagram of an example time-of-flight sensor according to some implementations.

FIG. 4 is a block diagram of an example ToF sensor 116, which includes a light emitter 402 and a light detector 404. Although just one light emitter 402 and one light detector 404 are shown in FIG. 4, the ToF sensor 116 in other examples can include multiple light emitters and/or multiple light detectors. The light emitter 402 can include a light emitting diode (LED) or another type of light source that can produce light either in the visible spectrum or invisible spectrum (e.g., infrared or ultraviolet light). The light detector 404 can include a photo-sensitive diode or other type of light detector.

The light emitter 402 can be used to transmit an emitted light signal 406, which can include one or more light pulses in some examples, into the container chamber 114. An input voltage 401 is applied to the light emitter 402 to cause the light emitter 402 to transmit the emitted light signal 406. The emitted light signal 406 is reflected as a reflected light signal 408 from a surface inside the container chamber 104, where the surface can be the rear-facing surface 120 of a physical item 118, or the front surface 122 of the container 104 (FIG. 1). The reflected light signal 408 is detected by the light detector 404, which produces an output 410 that is responsive to the reflected light signal 408. The output 410 can include an output voltage or an output current, which has a value (e.g. an amplitude) that is based on a property of the reflected light signal 408. Although not shown, the output 410 can be provided through a signal chain including intermediate circuits, such as an analog-to-digital (ADC) converter, an amplifier, a buffer, and so forth.

In other examples, the ToF sensor 116 can include a different type of signal emitter to emit another type of signal, such as an acoustic signal, electromagnetic signal, and so forth. In such other examples, the ToF sensor 116 can also include a different type of signal detector, such as an acoustic sensor, an electromagnetic sensor, and so forth.

The following provides further details associated with various likelihood ratio tests can be employed for determining a load status of a moveable platform.

In the ensuing discussion, a signal transmitted by the ToF sensor 116, such as by the light emitter 402 or other signal emitter, can be represented as x(t). A signal received by the ToF sensor 116, such as by the light detector 404 or other signal sensor, can be represented as y(t).

In more specific examples, x(t) can be a transmitted signal of N pulse trains including M pulses per pulse train. Note that in other examples, the transmitted signal x(t) can have a form different from that described below.

For each pulse train of M pulses, T separates each of the individual pulses of width T/2. Thus a single pulse train of M pulses resembles a square-wave signal with period T at 50% duty cycle for $0 \leq t < MT$ (M multiplied by T) and zero for all other times t. By spacing each pulse train $T_s$ seconds apart ($T_s$ represents the length of a sampling period), where $MT < T_s$, a continuous-time transmitted signal, x(t), can be expressed as:

$$x(t) \triangleq \sum_{k=0}^{N-1} \sqrt{P}\, p_{T/2}(t) * \delta_T^M(t - kT_s), \quad \text{(Eq. 1)}$$

where $\sqrt{P}$ represents a pulse amplitude, and other parameters of Eq. 1 are provided below. The operator * denotes continuous-time linear convolution defined as $$u(t)*v(t) \triangleq \int_{-\infty}^{+\infty} u(s)v(t-s)ds. \quad (Eq. 2)$$

Let $\delta(t)$ be a Dirac delta function, i.e., $$\delta(t) \triangleq \lim_{a \to 0} \frac{1}{a\sqrt{\pi}} e^{-t^2/a^2}. \quad (Eq. 3)$$

Let $\delta_T^M(t)$ be a waveform including a train of M Dirac delta functions time-shifted and spaced T seconds apart:

$$\delta_T^M(t) \triangleq \sum_{m=0}^{M-1} \delta(t-mT). \quad (Eq. 4)$$

Let $p_W(t)$ be a single rectangular pulse of amplitude 1, width W, starting at t=0, ending at t=W, and amplitude zero otherwise, i.e., $$p_W(t) \triangleq \begin{cases} 1; & 0 \le t < W \\ 0; & \text{otherwise} \end{cases}. \quad (Eq. 5)$$

As noted above, the likelihood ratio test compares the goodness or fit of two models, a null model (or null hypothesis) and an alternative model (or alternative hypothesis).

Let $H_0$ be the null hypothesis representing an empty container, i.e., no physical item. For $H_0$, the received signal $y_0(t)$ is expressed as:

$$y_0(t) = \alpha_c A_c x(t-T_c) + \eta(t), \quad (Eq. 6)$$

where $\alpha_c$ is the reflection coefficient of the container, $A_c$ is the effective reflective area of the sensor device's field of view cone for an empty container, $T_c$ is the round-trip time shift attributed to the container's reflection, and $\eta(t)$ is additive noise.

Let $H_1$ be the alternative hypothesis representing at least one physical item being present within the container. For the alternative hypothesis, the received signal $y_1(t)$ is expressed as:

$$y_1(t) = \alpha_b A_b x(t-T_b) + \alpha_c(A_c-A_b)x(t-T_c) + \eta(t), \quad (Eq. 7)$$

where $\alpha_b$ be the reflection coefficient of the physical item, $A_b$ is the effective reflective area of the physical item, and $T_b$ is the round-trip time shift attributed by the physical item's reflection.

In standard form, the hypothesis test is $$H_0: y(t) = y_0(t) \text{ (Empty)}$$

$$H_1: y(t) = y_1(t) \text{ (Not Empty)}, \quad (Eq. 8)$$

where y(t) is the received signal corresponding to the transmitted x(t), $y_0(t)$ is the received signal corresponding to an empty container, and $y_1(t)$ is the received signal corresponding to a container that is not empty, i.e., a physical item is present. As written, the decision is binary where 0 means empty and 1 means not empty (i.e., no rejection region as written). In other examples, the hypothesis test can be generalized to indicate more than two different levels of loading of the container.

In some examples, before applying the hypothesis test noted above, a receiver can first multiply a received signal y(t) by in-phase and quadrature-phase (I/Q) square-waveforms, and integrate before sampling using an analog-to-digital converter (ADC).

$$y_I(t) = y(t)\tilde{x}(t) \text{ (In-Phase)}, \quad (Eq. 9)$$

$$y_Q(t) = y(t)\tilde{x}(t-T/4) \text{ (Quadrature)}. \quad (Eq. 10)$$

Due to a common DC component, the pair x(t) and x(t–T/4) do not form an orthogonal basis and adds unnecessary mathematical explanation burden to the phase interpretation. For a more pseudo-intuitive discussion about phase using coordinates on an I/Q plot, the DC components and nuisance scalar can be removed as follows:

$$\tilde{x}(t) \triangleq \frac{2}{\sqrt{P}} x(t) - 1 \quad (Eq. 11)$$

$$= 2\sum_{k=0}^{N-1} p_{T/2}(t) * \delta_T^M(t-kT_s) - 1$$

$$\tilde{x}(t-T/4) \triangleq \frac{2}{\sqrt{P}} x(t-T/4) - 1$$

$$= 2\sum_{k=0}^{N-1} p_{T/2}(t-T/4) * \delta_T^M(t-kT_s) - 1$$

According to Eq. 11, an orthogonal basis can be provided in the form of zero-mean square-waves emulating the sine and cosine waveforms. Note also that $\tilde{x}(t)$ and $\tilde{x}(t-T/4)$ still have a 50% duty-cycle but now they are antipodal between 1 and −1 amplitude with zero mean over integer multiples of T.

Note that scaling both $\tilde{x}(t)$ and $\tilde{x}(t-T/4)$ by $1/\sqrt{MT}$ produces an orthonormal basis, $\tilde{x}(t)/\sqrt{MT}$ and $\tilde{x}(t-T/4\sqrt{MT}$.

In other examples, an orthogonal basis exists for when the transmitted waveform resembles a sinusoidal waveform. This may be intentional and may be done by filtering x(t) with a low-pass filter with a cutoff frequency above 1/T and below an integer number of harmonics, or it may be unintentional due to the bandwidth restrictions of hardware behaving as a low-pass filter. In these examples, x(t) and x(t–T/4) are sinusoidal waveforms 90° out of phase (e.g., cosine and sine waveforms with a frequency of 1/T hertz) and form a basis corresponding to the I/Q coefficients.

Next, the receiver then integrates the In-phase & Quadrature (I/Q) signals over NT for each of the N pulse trains comprising of M pulses, i.e., the discrete I/Q signals after integration and sampling can be written as $$y_I[n] = \int_{nT_s}^{nT_s+MT} y(t)\tilde{x}(t)dt, \text{ for } n=0,1,\ldots,(N-1) \text{ (In-Phase)} \quad (Eq. 11)$$

$$y_Q[n] = \int_{nT_s}^{nT_s+MT} y(t)\tilde{x}(t-T/4)dt, \text{ for } n=0,1,\ldots,(N-1) \text{ (Quadrature)} \quad (Eq. 12)$$

With the following assumptions, the null hypothesis and alternative hypothesis can be expressed according to Eqs. 13-16 further below.

In some examples, the assumptions are as follows:

1) A physical item should be closer than the farthest wall of the container and is within sensor range, i.e. $0 \le T_b < T_c < T/2$.

2) The integration time is less than the sampling period, i.e., $0 < MT < T_s$.

3) The reflection coefficients are bounded between 0 (black) and 1 (white), i.e., $0 \le \alpha_c \le 1$ and $0 \le \alpha_b \le 1$.

4) The reflective area of the physical item is bounded by the area of the container, i.e., $0 \leq A_b \leq A_c$.

5) The time shift attributed to the physical item is bounded by the empty container, i.e., $0 \leq T_b \leq T_c$.

6) Noise sampling is performed as follows:

$$\eta_I[n] \triangleq \int_{nT_s}^{nT_s+MT} \eta(t)\tilde{x}(t)dt, \quad \eta_Q[n] \triangleq \int_{nT_s}^{nT_s+MT} \eta(t)\tilde{x}\left(t - \frac{T}{4}\right)dt.$$

7) Let $\mu_\eta \triangleq E\{\eta(t)\}$, then $$\mu_{\eta_I} \triangleq E\{\eta_I[n]\}$$
$$= \int_{nT_s}^{nT_s+MT} E\{\eta(t)\}\tilde{x}(t)dt$$
$$= \mu_\eta \int_{nT_s}^{nT_s+MT} \tilde{x}(t)dt$$
$$= 0,$$

$$\mu_{\eta_Q} = E\{\eta_Q[n]\}$$
$$= \int_{nT_s}^{nT_s+MT} E\{\eta(t)\}\tilde{x}(t - T/4)dt$$
$$= \mu_\eta \int_{nT_s}^{nT_s+MT} \tilde{x}(t - T/4)dt$$
$$= 0$$

8) Let $\sigma_\eta^2 \triangleq E\{(\eta(t) - \mu_\eta)^2\} = E\{(\eta(t))^2\} - \mu_\eta^2$, then $$\sigma_{\eta_I}^2 \triangleq E\{(\eta_I[n])^2\}$$
$$= E\left\{\left(\int_{nT_s}^{nT_s+MT} \eta(t)\tilde{x}(t)dt\right)\left(\int_{nT_s}^{nT_s+MT} \eta(s)\tilde{x}(s)ds\right)\right\}$$
$$= E\left\{\int_{nT_s}^{nT_s+MT}\int_{nT_s}^{nT_s+MT} \eta(t)\eta(s)\tilde{x}(t)\tilde{x}(s)dsdt\right\}$$
$$= \int_{nT_s}^{nT_s+MT}\int_{nT_s}^{nT_s+MT} E\{\eta(t)\eta(s)\}\tilde{x}(t)\tilde{x}(s)dsdt$$
$$= \int_{nT_s}^{nT_s+MT}\int_{nT_s}^{nT_s+MT} \delta(s-t)(\sigma_\eta^2 + \mu_\eta^2)\tilde{x}(t)\tilde{x}(s)dsdt$$
$$= (\sigma_\eta^2 + \mu_\eta^2)\int_{nT_s}^{nT_s+MT} (\tilde{x}(t))^2 dt$$
$$= (\sigma_\eta^2 + \mu_\eta^2)MT,$$

$$\sigma_{\eta_Q}^2 \triangleq E\{(\eta_Q[n])^2\}$$
$$= E\left\{\left(\int_{nT_s}^{nT_s+MT} \eta(t)\tilde{x}(t-T/4)dt\right)\left(\int_{nT_s}^{nT_s+MT} \eta(s)\tilde{x}(s-T/4)ds\right)\right\}$$
$$= E\left\{\int_{nT_s}^{nT_s+MT}\int_{nT_s}^{nT_s+MT} \eta(t)\eta(s)\tilde{x}(t-T/4)\tilde{x}(s-T/4)dsdt\right\}$$
$$= \int_{nT_s}^{nT_s+MT}\int_{nT_s}^{nT_s+MT} E\{\eta(t)\eta(s)\}\tilde{x}(t-T/4)\tilde{x}(s-T/4)dsdt$$
$$= \int_{nT_s}^{nT_s+MT}\int_{nT_s}^{nT_s+MT} \delta(s-t)(\sigma_\eta^2 + \mu_\eta^2)\tilde{x}(t-T/4)\tilde{x}(s-T/4)dsdt$$
$$= (\sigma_\eta^2 + \mu_\eta^2)\int_{nT_s}^{nT_s+MT} (\tilde{x}(t-T/4))^2 dt$$
$$= (\sigma_\eta^2 + \mu_\eta^2)MT$$

According to the foregoing assumptions, the null hypothesis ($H_0$: EMPTY) in which I/Q discrete sampling has been applied is expressed as Eqs. 13 and 14 below.

$$y_{I|0}[n] = \int_{nT_s}^{nT_s+MT} y_0(t)\tilde{x}(t)dt \qquad \text{(Eq. 13)}$$
$$= \int_{nT_s}^{nT_s+MT} (\propto_c A_c x(t - T_c) + \eta(t))\tilde{x}(t)dt$$
$$= \propto_c A_c \int_{nT_s}^{nT_s+MT} x(t-T_c)\tilde{x}(t)dt + \int_{nT_s}^{nT_s+MT} \eta(t)\tilde{x}(t)dt$$
$$= 2\sqrt{P} \propto_c A_c \int_{nT_s}^{nT_s+MT} (p_{T/2}(t-T_c) * \delta_T^M(t-nT_s))$$
$$(p_{T/2}(t) * \delta_T^M(t-nT_s))dt - \sqrt{P} \propto_c A_c \int_{nT_s}^{nT_s+MT}$$
$$p_{T/2}(t-T_c) * \delta_T^M(t-nT_s)dt + \eta_I[n]$$
$$= 2\sqrt{P} \propto_c A_c \int_{nT_s}^{nT_s+MT} (p_{T/2-T_c}(t-T_c) * \delta_T^M(t-nT_s))dt -$$
$$\sqrt{P} \propto_c A_c(T/2)M + \eta_I[n]$$
$$= 2\sqrt{P} \propto_c A_c(T/2 - T_c)M - \sqrt{P} \propto_c A_c(T/2)M + \eta_I[n]$$
$$= 2\sqrt{P} \propto_c A_c(T/2)M - 2\sqrt{P} \propto_c A_c T_c M -$$
$$\sqrt{P} \propto_c A_c(T/2)M + \eta_I[n]$$
$$= \propto_c A_c M \sqrt{P}(T/2 - 2T_c) + \eta_I[n],$$

$$y_{Q|0}[n] = \int_{nT_s}^{nT_s+MT} y_0(t)\tilde{x}(t-T/4)dt \qquad \text{(Eq. 14)}$$
$$= \int_{nT_s}^{nT_s+MT} (\propto_c A_c x(t-T_c) + \eta(t))\tilde{x}(t-T/4)dt$$
$$= \propto_c A_c \int_{nT_s}^{nT_s+MT} x(t-T_c)\tilde{x}(t-T/4)dt +$$
$$\int_{nT_s}^{nT_s+MT} \eta(t)\tilde{x}(t-T/4)dt$$
$$= 2\sqrt{P} \propto_c A_c \int_{nT_s}^{nT_s+MT} (p_{T/2}(t-T_c) * \delta_T^M(t-nT_s))$$
$$(p_{T/2}(t-T/4) * \delta_T^M(t-nT_s))dt - \sqrt{P} \propto_c A_c \int_{nT_s}^{nT_s+MT}$$
$$p_{T/2}(t-T_c) * \delta_T^M(t-nT_s)dt + \eta_Q[n]$$
$$= 2\sqrt{P} \propto_c A_c \int_{nT_s}^{nT_s+MT} \left(\begin{array}{c} p_{T/2-|T/4-T_c|}(t-T_c) * \\ \delta_T^M(t-nT_s) \end{array}\right) dt -$$
$$\sqrt{P} \propto_c A_c(T/2)M + \eta_Q[n]$$
$$= 2\sqrt{P} \propto_c A_c(T/2 - |T/4 - T_c|)M -$$
$$\sqrt{P} \propto_c A_c(T/2)M + \eta_Q[n]$$
$$= 2\sqrt{P} \propto_c A_c(T/2)M - 2\sqrt{P} \propto_c A_c|T/4 - T_c|M -$$
$$\sqrt{P} \propto_c A_c(T/2)M + \eta_Q[n]$$
$$= \propto_c A_c M \sqrt{P}(T/2 - 2|T/4 - T_c|) + \eta_Q[n].$$

According to the foregoing assumptions, the alternative hypothesis ($H_1$: NOT EMPTY) in which I/Q discrete sampling has been applied is expressed as Eqs. 15 and 16 below.

$$y_{I|1}[n] = \int_{nT_s}^{nT_s+MT} y_1(t)\tilde{x}(t)dt \qquad \text{(Eq. 15)}$$
$$= \int_{nT_s}^{nT_s+MT} \left(\begin{array}{c} \propto_b A_b x(t-T_b) + \\ \propto_c (A_c - A_b)x(t-T_c) + \eta(t) \end{array}\right) \tilde{x}(t)dt$$
$$= \propto_b A_b \int_{nT_s}^{nT_s+MT} x(t-T_b)\tilde{x}(t)dt + \propto_c (A_c - A_b)$$
$$\int_{nT_s}^{nT_s+MT} x(t-T_c)\tilde{x}(t)dt + \int_{nT_s}^{nT_s+MT} \eta(t)\tilde{x}(t)dt$$

-continued $$= \alpha_b A_b M \sqrt{P}(T/2-2T_b) + \alpha_c A_c M \sqrt{P}(T/2-2T_c) -$$
$$\alpha_c A_b M \sqrt{P}(T/2-2T_c) + \eta_I[n]$$
$$= \alpha_c A_b M \sqrt{P}(T/2-2T_b) - \alpha_c A_b M \sqrt{P}(T/2-2T_c) + y_{I|0}[n]$$
$$= A_b M \sqrt{P}(\alpha_b(T/2-2T_b) - \alpha_c(T/2-2T_c)) + y_{I|0}[n],$$

$$y_{Q|1}[n] = \int_{nT_s}^{nT_s+MT} y_1(t)\tilde{x}(t-T/4)dt \quad \text{(Eq. 16)}$$

$$= \int_{nT_s}^{nT_s+MT} \binom{\alpha_c A_c x(t-T_b) +}{\alpha_c (A_c - A_b)x(t-T_c) + \eta(t)} \tilde{x}(t-T/4)dt$$

$$= \alpha_b A_b \int_{nT_s}^{nT_s+MT} x(t-T_b)\tilde{x}(t-T/4)dt + \alpha_c (A_c - A_b)$$
$$\int_{nT_s}^{nT_s+MT} x(t-T_c)\tilde{x}(t-T/4)dt +$$
$$\int_{nT_s}^{nT_s+MT} \eta(t)\tilde{x}(t-T/4)dt$$

$$= \alpha_b A_b M \sqrt{P}(T/2-2|T/4-T_b|) +$$
$$\alpha_c A_c M \sqrt{P}(T/2-2|T/4-T_c|) -$$
$$\alpha_c A_b M \sqrt{P}(T/2-2|T/4-T_c|) + \eta_Q[n]$$
$$= \alpha_c A_b M \sqrt{P}(T/2-2|T/4-T_b|) -$$
$$\alpha_c A_b M \sqrt{P}(T/2-2|T/4-T_c|) + y_{Q|0}[n]$$
$$= A_b M \sqrt{P} \binom{\alpha_b(T/2-2|T/4-T_b|) -}{\alpha_c(T/2-2|T/4-T_c|)} + y_{Q|0}[n]$$

For readability, the following substitutions are used:

$$U_b \triangleq T/2-2T_b, \; V_b \triangleq T/2-2|T/4-T_b|; \; (0 \leq T_b \leq T/2)$$

$$U_c \triangleq T/2-2T_c, \; V_c \triangleq T/2-2|T/4-T_c|; \; (0 \leq T_c \leq T/2).$$

Thus, the received discrete I&Q samples for both $H_0$ and $H_1$ are $$H_0: y_{I|0}[n] = \alpha_c A_c M\sqrt{P}U_c + \eta_I[n].$$

$$y_{Q|0}[n] = \alpha_c A_c M\sqrt{P}V_c + \eta_Q[n]. \quad \text{(Eq. 17)}$$

$$H_1: y_{I|1}[n] = A_b M\sqrt{P}(\alpha_b U_b - \alpha_c U_c) + y_{I|0}[n].$$

$$y_{Q|1}[n] = A_b M\sqrt{P}(\alpha_b V_b - \alpha_c V_c) + y_{Q|0}[n]. \quad \text{(Eq. 18)}$$

For $H_1$, both $y_{I|1}[n]$ and $y_{Q|1}[n]$ are in terms of $y_{I|0}[n]$ and $y_{Q|0}[n]$, respectfully, along with corresponding biasing terms for when cargo is present. In other words, the above model describes the case where a physical item is present using terms of when the container is empty along with the adjustments to account for the physical item being present. One interpretation is that the biasing terms provide a "delta offset" to a "baseline" vector.

$$\Delta_I[n] \triangleq A_b M\sqrt{P}(\alpha_b U_b - \alpha_c U_c). \quad \text{(Eq. 19)}$$

$$\Delta_Q[n] \triangleq A_b M\sqrt{P}(\alpha_b V_b - \alpha_c V_c). \quad \text{(Eq. 20)}$$

In column-vector form, the discrete samples become $$\Delta[n] = (\Delta_I[n] \Delta_Q[n])'. \quad \text{(Eq. 21)}$$

$$H_0: y_0[n] = (y_{I|0}[n] y_{Q|0}[n])'. \quad \text{(Eq. 22)}$$

$$H_1: y_1[n] = (y_{I|1}[n] y_{Q|1}[n])' = \Delta[n] + y_0[n]. \quad \text{(Eq. 23)}$$

Log-Likelihood Ratio (LLR) Test

A likelihood ratio test $\lambda(y)$ and the log-likelihood ratio (LLR) test $LLR(y)$ can be expressed as follows:

$$\lambda(y) \triangleq \frac{f(y|1)}{f(y|0)} \gtreqless_0^1 1 \Longrightarrow LLR(y) \triangleq \ln\lambda(y) \gtreqless_0^1 0. \quad \text{(Eq. 24)}$$

$$LLR(y) \triangleq \ln\lambda(y) = \ln f(y|1) - \ln f(y|0). \quad \text{(Eq. 25)}$$

For the equi-variance multi-variable Gaussian noise model, the following probability density distributions, $$f(y|0) \triangleq \frac{1}{2\pi|\Sigma|}\exp\left(-\frac{1}{2}(y-\mu_0)'\Sigma^{-1}(y-\mu_0)\right), \quad \text{(Eq. 26)}$$

$$f(y|1) \triangleq \frac{1}{2\pi|\Sigma|}\exp\left(-\frac{1}{2}(y-\mu_1)'\Sigma^{-1}(y-\mu_1)\right), \quad \text{(Eq. 27)}$$

represent an empty container and a loaded container, respectfully. In Eq. 26, the parameter $\mu_0$ represents an estimated mean of the null hypothesis $y_0[n]$ signals, and in Eq. 27, the parameter $\mu_1$ represents an estimated mean of the alternative hypothesis $y_1[n]$ signals. Note that $y_0[n]$ represents received signals (such as signals received from the light detector 404 corresponding to an empty container, and $y_1[n]$ represents received signals corresponding to a non-empty container. For an example channel model (model of a communications medium through which light signals are transmitted and received) and assuming zero-mean noise, the additive noise covariance matrix can be expressed as $$\Sigma \triangleq E\{\eta\eta'\}. \quad \text{(Eq. 28)}$$

and the LLR function $LLR(y)$ becomes $$LLR(y) = \frac{1}{2}((y-\mu_0)'\Sigma^{-1}(y-\mu_0) - (y-\mu_1)'\Sigma^{-1}(y-\mu_1)) \quad \text{(Eq. 29)}$$

If the additive noise is assumed to be additive white Gaussian noise (AWGN), then $$\Sigma = \sigma_\eta^2 I_2, \quad \text{(Eq. 30)}$$

and the LLR function $LLR(y)$ simplifies further to $$LLR(y) = \frac{1}{2\sigma_\eta^2}((y-\mu_0)'(y-\mu_0) - (y-\mu_1)'(y-\mu_1)) \quad \text{(Eq. 31)}$$
$$= \frac{1}{2\sigma_\eta^2}((y-\mu_0)'(y-\mu_0) + (\mu_0 + \Delta - y)'(y-\mu_0 - \Delta))$$
$$= \frac{1}{2\sigma_\eta^2}(2(y' - \mu_0')\Delta - \Delta'\Delta),$$

where $$\mu_1 = \mu_0 + \Delta, \quad \text{(Eq. 32)}$$

Now, the log-likelihood ratio test can be written in terms of a discrete signal $$LLR(y[n]) \triangleq \frac{1}{2\sigma_\eta^2}(2(y'[n] - \hat{\mu}_0'[n])\hat{\Delta}[n] - \hat{\Delta}'[n]\hat{\Delta}[n]), \quad \text{(Eq. 33)}$$

where $$\hat{\mu}_1[n] = \hat{\mu}_0[n] + \hat{\Delta}[n], \quad \text{(Eq. 34)}$$

$$\hat{\Delta}[n] = \hat{\mu}_1[n] - \hat{\mu}_0[n] \quad \text{(Eq. 35)}$$

In Eq. 34, $\hat{\mu}_0[n]$ represents an estimated baseline corresponding to an empty container.

FIG. 5A shows an example depicting values of the LLR function LLR(y[n]) calculated as set forth above as data samples y[n] are received, where n is the sample index represented by the horizontal axis in FIG. 5A, and curve 502 represents the values of LLR(y[n]) at each sample index.

As discussed further above, the output values of the log-likelihood ratio test, LLR(y[n]), can be compared to thresholds (including an upper threshold and a lower threshold) to determine whether a container is empty or loaded. However, as seen in FIG. 5A, the LLR(y[n]) values vary widely as received signal samples are continually received, and thus may not accurately determine the load status of the container. As discussed further below, the sequential probability ratio test (SPRT) can be used instead, which aggregates (e.g., sums), multiple LLR(y[n]) values.

To set the upper and lower thresholds, consider $$A < LLR(y[n]) < B$$

$$A < \frac{1}{2\sigma_\eta^2}(2(y'[n] - \hat{\mu}_0'[n])\hat{\Delta}[n] - \hat{\Delta}'[n]\hat{\Delta}[n]) < B$$

$$\sigma_\eta^2 A < (y'[n] - \hat{\mu}_0'[n])\hat{\Delta}[n] - \hat{\Delta}'[n]\hat{\Delta}[n]/2 < \sigma_\eta^2 B$$

$$\sigma_\eta^2 A < \tilde{S}_0 < \sigma_\eta^2 B,$$

where $\{A, B\} \in \mathbb{R}$ are real-numbered thresholds selected to control the type II and type I error rates, respectively. Estimated thresholds are calculated as follows, where $\bar{\pi}_L$ represents the lower threshold, and $\bar{\pi}_U$ represents the upper threshold.

$$\bar{\pi}_L \triangleq \hat{\sigma}_\eta^2[n]A, \quad \bar{\pi}_U \triangleq \hat{\sigma}_\eta^2[n]B. \tag{Eq. 36}$$

More generally, the upper and lower thresholds are computed based on tuning parameters (such as A and B) selected to control error rates.

In practice, obtaining a baseline estimate for $\hat{\mu}_1[n]$ may prove difficult because of load dependency, so the process can start by assuming that the observation y[n] is that of a loaded container, then $$\hat{\Delta}[n] = \hat{\mu}_y[n] - \hat{\mu}_0[n], \tag{Eq. 37}$$

can be used as the estimated "delta offset" where $\hat{\mu}_y[n]$ is the estimated sample mean of y[n].

$$H_0: E\{\hat{\Delta}[n] \mid 0\} = E\{\hat{\mu}_y[n] - \hat{\mu}_0[n]\} \tag{Eq. 38}$$
$$= E\{\hat{\mu}_y[n]\} - E\{\hat{\mu}_0[n]\}$$
$$= \mu_0 - \mu_0$$
$$= \underline{0}_{2\times 1},$$

$$H_1: E\{\hat{\Delta}[n] \mid 1\} = E\{\hat{\mu}_y[n] - \hat{\mu}_0[n]\}$$
$$= E\{\hat{\mu}_y[n]\} - E\{\hat{\mu}_0[n]\}$$
$$= \mu_1 - \mu_0$$
$$= \Delta.$$

For a single received signal sample, $\hat{\mu}_n[n] = y[n]$, and $$\hat{\Delta}[n] = y[n] - \hat{\mu}_0[n]. \tag{Eq. 39}$$

and the LLR expression simplifies to $$LLR(y) = \frac{1}{2\sigma_\eta^2}(\Delta_I^2 + \Delta_Q^2). \tag{Eq. 40}$$

Going back to the case where the noise may be jointly correlated, the log-likelihood ratio test is expressed as:

$$LLR(y) = \frac{1}{2}((y-\mu_0)'\Sigma^{-1}(y-\mu_0) - (y-\mu_1)'\Sigma^{-1}(y-\mu_1)), \tag{Eq. 41}$$

for the LLR expression where the noise covariance matrix and its inverse, respectively, are $$\Sigma = \begin{pmatrix} \sigma_I^2 & \rho\sigma_I\sigma_Q \\ \rho\sigma_I\sigma_Q & \sigma_Q^2 \end{pmatrix}; \tag{Eq. 42}$$

$$\Sigma^{-1} = \begin{pmatrix} \sigma_I^{-2} & -\rho\sigma_Q^{-1}\sigma_I^{-1} \\ -\rho\sigma_I^{-1}\sigma_Q^{-1} & \sigma_Q^{-2} \end{pmatrix} \frac{1}{1-\rho^2}.$$

Using again, $\mu_1 = \mu_0 + \Delta$ and $\Delta = \mu_0 - \mu_1$, the LLR expression simplifies to $$LLR(y) = (y-\mu_0)'\Sigma^{-1}\Delta - \Delta'\Sigma^{-1}\Delta/2. \tag{Eq. 43}$$

Again in practice, obtaining a baseline estimate for $\hat{\mu}_1[n]$ may prove difficult because of load dependency, so the process can start by assuming that the observation y[n] is that of a loaded container, then for a single sample $$\hat{\Delta}[n] = y[n] - \hat{\mu}_0[n], \tag{Eq. 44}$$

Thus, the LLR expression further simplifies to $$LLR(y) = \frac{1}{2(1-\rho^2)}(\Delta_I^2\sigma_I^{-2} + \Delta_Q^2\sigma_Q^{-2} - 2\Delta_Q\Delta_I\rho\sigma_I^{-1}\sigma_Q^{-1}). \tag{Eq. 45}$$

If $\sigma_Q = \sigma_I = \sigma_\eta$, then $$LLR(y) = \frac{1}{2(1-\rho^2)\sigma_\eta^2}(\Delta_I^2 + \Delta_Q^2 - 2\Delta_Q\Delta_I\rho). \tag{Eq. 46}$$

If $\rho = 0$, then $$LLR(y) = \frac{1}{2\sigma_\eta^2}(\Delta_I^2 + \Delta_Q^2), \tag{Eq. 47}$$

which is the same as above when assuming AWGN.

Sequential Probability Ratio Test (SPRT):

The following describes the SPRT in detail, according to some examples. As noted above, the SPRT sums or otherwise aggregates a number of LLR output values to produce an SPRT output value, and the SPRT output value (represented by curve 504 in FIG. 5B) can be compared to an upper threshold 506 and a lower threshold 508 as depicted in FIG. 5B. FIG. 5B depicts SPRT output values as a function of received signal samples (sample indexes). Because the SPRT output value is based on the sum of a number of LLR output values, FIG. 5B shows the SPRT output value 504 as continually increasing as additional received signal samples are received. When the SPRT output value 504 exceeds the upper threshold 506, that indicates that cargo has been detected, and the container can be marked as loaded. In contrast, when the SPRT output value 504 drops below the lower threshold 506, that indicates that the container is empty.

Generally, in employing the SPRT, multiple values are computed using a likelihood ratio test function (e.g., the LLR function discussed above) applied on corresponding samples of measurement data received from the at least one sensor. The multiple values are aggregated to produce an aggregate value, and then compared to at least one threshold to determine a load status of a container.

Using the vector notation from earlier (see $y_0[n]$, $y_1[n]$ and $\Delta[n]$), let $$y[n] \triangleq (y_I[n] y_Q[n]), \quad \text{(Eq. 48)}$$

be the received discrete coordinate samples, where $$y_I[n] \triangleq \int_{nT_s}^{nT_s+MT} y(t)\tilde{x}(t)dt, \; y_Q[n] \triangleq \int_{nT_s}^{nT_s+MT} y(t)\tilde{x}(t-T/4)\,dt. \quad \text{(Eq. 49)}$$

Further expanding on this notation, $$y[0:n] \triangleq (y_I[0:n] y_Q[0:n]), \quad \text{(Eq. 50)}$$

$$y_I[0:n] \triangleq (y_I[0] y_I[1] \ldots y_I[n])', \quad \text{(Eq. 51)}$$

$$y_Q[0:n] \triangleq (y_Q[0] y_Q[1] \ldots y_Q[n])', \quad \text{(Eq. 52)}$$

with each including the latest (n+1) samples.

$$\lambda(y[0:n]) \triangleq \frac{f(y[0:n]|1)}{f(y[0:n]|0)} = \frac{\prod_{k=0}^{n} f(y[k]|1)}{\prod_{k=0}^{n} f(y[k]|0)}, \quad \text{(Eq. 53)}$$

$$LLR(y[0:n]) \triangleq \quad \text{(Eq. 54)}$$

$$\ln\lambda(y[0:n]) = \sum_{k=0}^{n} f(y[k]|1) - \sum_{k=0}^{n} f(y[k]|0) = \sum_{k=0}^{n} LLR(y[k]),$$

$$S_n \triangleq \sum_{k=0}^{n} LLR(y[k]) \quad \text{(Eq. 55)}$$

$$= \sum_{k=0}^{n} \frac{1}{2\sigma_\eta^2} (2(y'[k] - \hat{\mu}_0'[k])\hat{\Delta}[k] - \hat{\Delta}'[k]\hat{\Delta}[k]).$$

In Eq. 55, $S_n$ represents the SPRT output value derived from summing n+1 LLR output values.

In order to set the upper and lower thresholds (represented as 506 and 508 in FIG. 5B), consider $$A < S_n < B$$

$$A < \frac{1}{2\sigma_\eta^2} \sum_{k=0}^{n} (2(y'[k] - \hat{\mu}_0'[k])\hat{\Delta}[k] - \hat{\Delta}'[k]\hat{\Delta}[k]) < B$$

$$\sigma_\eta^2 A < \sum_{k=0}^{n} (y'[k] - \hat{\mu}_0'[k])\hat{\Delta}[k] - \sum_{k=0}^{n} \hat{\Delta}'[k]\hat{\Delta}[k]/2 < \sigma_\eta^2 B$$

$$\sigma_\eta^2 A < \tilde{S}_n < \sigma_\eta^2 B,$$

where $\{A, B\} \in \mathbb{R}$ are real-numbered thresholds selected to control the type II and type I error rates, respectively, and $$\tilde{S}_n \triangleq \sum_{k=0}^{n} \left( (y'[k] - \hat{\mu}_0'[k])\hat{\Delta}[k] - \frac{\hat{\Delta}'[k]\hat{\Delta}[k]}{2} \right), \quad \text{(Eq. 56)}$$

In practice, implementations can use the sampled statistic $\hat{\sigma}_\eta^2[n]$ to estimate $\sigma_\eta^2$ which inherently has a variance, so to mitigate early termination due to small sample size variation, a process can "gear-step" the upper and lower thresholds using any number of schemes, e.g., $$\bar{\pi}_L < \tilde{S}_n < \bar{\pi}_U$$

$$-\infty < \tilde{S}_n < +\infty; \; n < N_\infty$$

$$\hat{\sigma}_\eta^2[n](A - Ce^{(1-n)}) < \tilde{S}_n < \hat{\sigma}_\eta^2[n](B + De^{(1-n)}); \; n \geq N_\infty$$

where $\{A, B, C, D\} \in \mathbb{R}$ are real-numbered constants selected to control the type I and type II error rates and $N_\infty$ is the number of samples to wait allowing for settlement of the sample statistic variances (i.e., minimum number of observed samples before allowing detection to make a decision). Thus, the lower and upper thresholds ($\bar{\pi}_L, \bar{\pi}_U$) are computed according to Eq. 57:

$$\bar{\pi}_L \triangleq \begin{cases} \hat{\sigma}_\eta^2[n](A - Ce^{(1-n)}); & n \geq N_\infty \\ -\infty; & n < N_\infty \end{cases} \text{ and } \quad \text{(Eq. 57)}$$

$$\bar{\pi}_U \triangleq \begin{cases} \hat{\sigma}_\eta^2[n](B + Ce^{(1-n)}); & n \geq N_\infty \\ +\infty; & n < N_\infty \end{cases},$$

Another example of "gear-stepping" the upper and lower thresholds can be according to $$\bar{\pi}_L < \tilde{S}_n < \bar{\pi}_U$$

$$-\infty < \tilde{S}_n < +\infty; \; n < N_\infty$$

$$\hat{\sigma}_\eta^2[n]\left(A - \frac{C}{\sqrt{n}}\right) < \tilde{S}_n < \hat{\sigma}_\eta^2[n]\left(B + \frac{D}{\sqrt{n}}\right); \; n \geq N_\infty$$

where $$\bar{\pi}_L \triangleq \begin{cases} \hat{\sigma}_\eta^2[n]\left(A - \frac{C}{\sqrt{n}}\right); & n \geq N_\infty \\ -\infty; & n < N_\infty \end{cases} \text{ and } \quad \text{(Eq. 58)}$$

$$\bar{\pi}_U \triangleq \begin{cases} \hat{\sigma}_\eta^2[n]\left(B + \frac{D}{\sqrt{n}}\right); & n \geq N_\infty \\ +\infty; & n < N_\infty \end{cases},$$

are the corresponding lower and upper thresholds, respectfully.

Generalized-Likelihood-Ratio-Test (GLRT):

Use of the LLR and SPRT tests discussed above assume that certain characteristics of the container are known, such as the color of the inner wall of the container. In some cases, such characteristics of the container may not be known. As a result, the parameter $\hat{\mu}_0[n]$ that represents an estimated mean of the null hypothesis $y_0[n]$ signals cannot be derived, which would mean that the LLR and SPRT tests cannot be used.

In such situations, the GLRT can be used instead, where the GLRT can use a different value to represent $\hat{\mu}^0[n]$, as explained below.

Let an observed received signal at time n be y[n] as follows:

$$y[n] = \begin{pmatrix} y_I[n] \\ y_Q[n] \end{pmatrix}; \; d[n] = r_d[n]\begin{pmatrix} \cos\theta_d \\ \sin\theta_d \end{pmatrix}, \quad \text{(Eq. 59)}$$

where $$\theta_d = \tan^{-1}\frac{V_c}{U_c} = \tan^{-1}\left(\frac{T/2 - 2|T/4 - T_c|}{T/2 - 2T_c}\right);$$ (Eq. 60)

Figure 6:
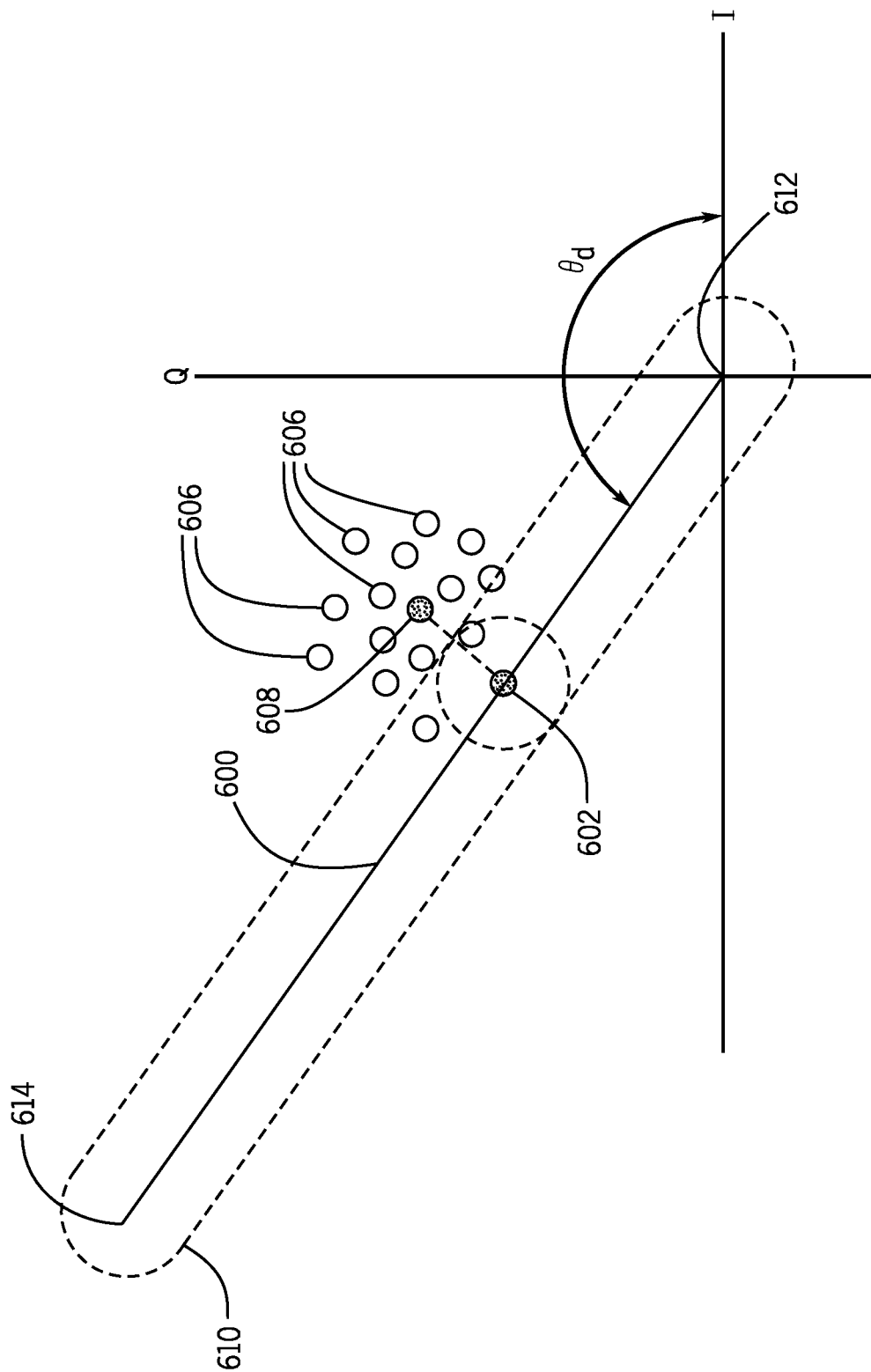
FIG. 6 is a graph of an in-phase/quadrature-phase plane showing a subspace used for a likelihood ratio test, according to further implementations.

(for square-wave basis functions)

$$\theta_d = \frac{4\pi L_c}{Tc_{m/s}}; \text{ (for sinusoidal basis functions)}$$ (Eq. 61)

and d[n] is the point along the subspace defined by the phase $\theta_d$ in the I/Q plane (an I/Q plane is shown in FIG. 6) that is $r_d[n]$ from the origin where the round-trip ToF defines $\theta_d$ in radians for the given carrier period T and the speed of light $c_{m/s}$. In Eq. 60, $T_c$ is the round-trip time shift attributed to the container's reflection, and $U_c$ and $V_c$ are defined right above Eq. 16 further above. In Eq. 61, $L_c$ represents the length of the container.

In FIG. 6, the horizontal axis of the I/Q plane is the in-phase (I) axis, while the vertical axis is the quadrature-phase (Q) axis. Using the Cartesian distance for the norm, a vector y[n]–d[n] (represented by line 600 in FIG. 6) is the vector connecting the points y[n] and d[n]. A point 602 on the line 600 represents d[n]. The angle $\theta_d$ is between the I axis and the line 600.

FIG. 6 further shows points 606 (blank circles) that are observed received signals y[n] corresponding to signals of a container including at least one physical item. A darkened circle 608 is a mean (or other aggregate) of the observed received signals y[n] corresponding to signals of a container including at least one physical item. This mean is referred to as a "mean observation" in the ensuing discussion. The dashed oval 610 around the line 600 represents the decision region of the GLRT. The origin endpoint 612 of the line 600 represents a container with a black wall, where no light is reflected. The opposite endpoint 614 of the line 600 represents a container with a white wall, where all light is reflected. Other points along the line 600 represent other colors of the wall of the container.

The GLRT seeks to find the closest point along the line 600 to the mean observation (608). In FIG. 6, such closest point is the point 602 representing d[n]. This extrema point (602) is unique, so the GLRT can take the derivative of the vector y[n]–d[n] with respect to $r_d[n]$, $$\|y[n] - d[n]\|_2^2 = \left\|\begin{array}{c} y_I[n] - r_d[n]\cos\theta_d \\ y_Q[n] - r_d[n]\sin\theta_d \end{array}\right\|_2^2 =$$ (Eq. 62)

$$(y_I[n] - r_d[n]\cos\theta_d)^2 + (y_Q[n] - r_d[n]\sin\theta_d)^2$$

$$\frac{\partial}{\partial r_d[n]}\|y[n] - d[n]\|_2^2 = \frac{\partial}{\partial r_d[n]}(y_I[n] - r_d[n]\cos\theta_d)^2 +$$ (Eq. 63)

$$\frac{\partial}{\partial r_d[n]}(y_Q[n] - r_d[n]\sin\theta_d)^2 \frac{\partial}{\partial r_d[n]}(y_I[n] - r_d[n]\cos\theta_d)^2 =$$

$$-2y_I[n]\cos\theta_d + 2r_d[n](\cos\theta_d)^2 \frac{\partial}{\partial r_d[n]}(y_Q[n] - r_d[n]\sin\theta_d)^2 =$$

$$-2y_Q[n]\sin\theta_d + 2r_d[n](\sin\theta_d)^2.$$

The derivative is set to zero, and the GLRT can solve for $r_d[n]$ as follows:

$$\frac{\partial}{\partial r_d[n]}\|y[n] - d[n]\|_2^2 = -2y_I[n]\cos\theta_d +$$ (Eq. 64)

$$2r_d[n](\cos\theta_d)^2 - 2y_Q[n]\sin\theta_d + 2r_d[n](\sin\theta_d)^2 = 0,$$

$$r_d[n]((\cos\theta_d)^2 + (\sin\theta_d)^2) = y_I[n]\cos\theta_d + y_Q[n]\sin\theta_d,$$ (Eq. 65)

$$r_d[n] = y_I[n]\cos\theta_d + y_Q[n]\sin\theta_d.$$ (Eq. 66)

Note that $r_d[n]$ may be negative depending on the combination of observation y[n] and the container's length $L_c$. Because of the physical interpretation, d[n] can be restricted to be the origin when $r_d[n]$ is negative, i.e., $$\hat{d}[n] = \hat{r}_d[n]\begin{pmatrix}\cos\theta_d \\ \sin\theta_d\end{pmatrix} \text{ where } \hat{r}_d[n] \triangleq \begin{cases} r_d[n]; & 0 \le r_d[n] \\ 0; & 0 > r_d[n] \end{cases}.$$ (Eq. 67)

In accordance with some implementations of the present disclosure, the parameter $\hat{d}[n]$ calculated above can be used as the baseline vector $\hat{\mu}_0[n]$. Given this estimate of $\hat{\mu}_0[n]$, either the LLR test or the SPRT can be then used, as discussed above.

More generally, the GLRT involves defining a subspace (e.g. subspace 610 in FIG. 6) based on a phase (e.g., $\theta_d$), identifying a point (e.g., d[n]) in the subspace that is closest to points representing measurement data received from at least one sensor, using the identified point as an estimated baseline corresponding to an empty container, and computing a value using the estimated baseline, where the value is computed by using an LLR test or the SPRT.

In some examples as discussed above, the load status detector 208 and the LRT function 209 (which can perform any of the LLR, SPRT, or GLRT tests, for example) can be implemented as machine-readable instructions executable on one or more processors.

The machine-readable instructions can be stored in a non-transitory computer-readable or machine-readable storage medium. The storage medium can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method performed by at least one processor, comprising:
receiving measurement data from at least one sensor that detects a signal reflected from a surface inside a platform;
applying a likelihood ratio test using the measurement data, wherein applying the likelihood ratio test comprises:
computing a plurality of values using a likelihood ratio test function applied on corresponding samples of the measurement data received from the at least one sensor, and
aggregating the plurality of values to produce an aggregate value; and
determining a load status of the platform based on the aggregate value produced by the likelihood ratio test.

2. The method of claim 1, wherein applying the likelihood ratio test comprises applying a log likelihood ratio test.

3. The method of claim 1, wherein determining the load status of the platform is based on comparing the aggregate value to at least one threshold, wherein the aggregate value having a first relationship to the at least one threshold indicates that the platform is empty, and the aggregate value having a second relationship to the at least one threshold indicates that the platform is loaded.

4. The method of claim 3, further comprising:
computing the at least one threshold based on tuning parameters selected to control error rates.

5. The method of claim 1, wherein applying the likelihood ratio test comprises applying a generalized likelihood ratio test.

6. A method performed by at least one processor, comprising:
receiving measurement data from at least one sensor that detects a signal reflected from a surface inside a platform;
applying a generalized likelihood ratio test using the measurement data, wherein applying the generalized likelihood ratio test comprises:
defining a subspace based on a phase,
identifying a point in the subspace that is closest to points representing the measurement data received from the at least one sensor,
using the identified point as an estimated baseline corresponding to an empty platform; and
computing a value using the estimated baseline; and
determining a load status of the platform based on the generalized likelihood ratio test.

7. The method of claim 6, wherein computing the value using the estimated baseline comprises computing the value using a log-likelihood ratio test or a sequential probability ratio test.

8. An apparatus comprising:
at least one sensor to output measurement data responsive to detecting a signal reflected from a surface inside a platform; and
at least one processor configured to:
compute a value by applying a likelihood ratio test function on the measurement data, wherein the likelihood ratio test function is based on a ratio between a model representing an empty platform and a model representing a loaded platform, and
determine a load status of the platform based on the computed value.

9. The apparatus of claim 8, wherein the at least one sensor comprises a light detector to detect reflected light emitted by a light emitter.

10. The apparatus of claim 8, wherein the model representing the empty platform is based on a mean of measurement data samples representing the empty platform, and the model representing the loaded platform is based on a mean of measurement data samples representing the loaded platform.

11. The apparatus of claim 8, wherein the at least one processor is configured to:
compute a plurality of values output by applying the likelihood ratio test function on a plurality of measurement data samples from the at least one sensor; and
aggregate the plurality of values to produce an aggregate value,
wherein the determining of the load status is based on comparing the aggregate value to at least one threshold.

12. The apparatus of claim 8, wherein the at least one processor is configured to compare the computed value to at least one threshold, wherein the computed value having a first relationship to the at least one threshold indicates that the platform is empty, and the computed value having a second relationship to the at least one threshold indicates that the platform is loaded.

13. The apparatus of claim 8, wherein the at least one processor is configured to:
determine an estimated baseline corresponding to an empty platform by:
identifying a point in a subspace that is closest to points representing measurement data received from the at least one sensor, wherein the subspace corresponds to a specified phase in In-phase/Quadrature (IQ) space,
wherein the likelihood ratio test function is based on the estimated baseline.

14. A non-transitory machine-readable storage medium storing instructions that upon execution cause a system to:
receive measurement data from at least one sensor that detects a signal reflected from a surface inside a platform;
apply a likelihood ratio test using the measurement data, the likelihood ratio test based on a ratio between a model representing an empty platform and a model representing a loaded platform, and the likelihood ratio test producing an output value; and
determine a load status of the platform based on comparing the output value to at least one threshold.

15. The non-transitory machine-readable storage medium of claim 14, wherein the determining comprises:
indicating that the platform is empty responsive to the output value having a first relationship with respect to the at least one threshold, and
indicating that the platform is loaded responsive to the output value having a second relationship with respect to the at least one threshold.

16. The non-transitory machine-readable storage medium of claim 14, wherein the at least one sensor comprises a light detector to detect reflected light emitted by a light emitter.

17. The non-transitory machine-readable storage medium of claim 14, wherein the model representing the empty platform is based on a mean of measurement data samples representing the empty platform, and the model representing the loaded platform is based on a mean of measurement data samples representing the loaded platform.

18. The non-transitory machine-readable storage medium of claim 14, wherein the instructions upon execution cause the system to:
    compute a plurality of values output by applying a likelihood ratio test function of the likelihood ratio test on a plurality of measurement data samples from the at least one sensor; and
    aggregate the plurality of values to produce an aggregate value,
    wherein the determining of the load status is based on comparing the aggregate value to the at least one threshold.

19. The non-transitory machine-readable storage medium of claim 14, wherein the instructions upon execution cause the system to:
    compute the at least one threshold based on tuning parameters selected to control error rates.

\* \* \* \* \*